(12) United States Patent
Tsaliah

(10) Patent No.: US 12,504,770 B2
(45) Date of Patent: Dec. 23, 2025

(54) METHOD AND SYSTEM FOR DECELERATING AND REDIRECTING AN AIRBORNE PLATFORM

(71) Applicant: PARAZERO LTD., Kiryat Ono (IL)

(72) Inventor: Amir Tsaliah, Haifa (IL)

(73) Assignee: PARAZERO LTD., Kiryat Ono (IL)

(*) Notice: Subject to any disclaimer, the term of this patent is extended or adjusted under 35 U.S.C. 154(b) by 92 days.

(21) Appl. No.: 18/527,975

(22) Filed: Dec. 4, 2023

(65) Prior Publication Data

US 2024/0319745 A1    Sep. 26, 2024

Related U.S. Application Data

(63) Continuation-in-part of application No. 16/492,327, filed as application No. PCT/IL2018/050303 on Mar. 15, 2018, now abandoned.

(30) Foreign Application Priority Data

Mar. 22, 2017   (IL) .......................................... 251342

(51) Int. Cl.
  *G05D 1/654*     (2024.01)
  *B64D 45/04*     (2006.01)
  (Continued)

(52) U.S. Cl.
  CPC ........... *G05D 1/6546* (2024.01); *B64D 45/04* (2013.01); *B64U 30/29* (2023.01); *B64U 70/83* (2023.01);
  (Continued)

(58) Field of Classification Search
  None
  See application file for complete search history.

(56) References Cited

U.S. PATENT DOCUMENTS

| | | |
|---|---|---|
| 1,615,682 A | 1/1927 | Clark |
| 8,733,706 B1 | 5/2014 | Fernandez |
| (Continued) | | |

FOREIGN PATENT DOCUMENTS

| | | |
|---|---|---|
| CN | 202464133 U | 10/2012 |
| CN | 203889066 U | 10/2014 |
| (Continued) | | |

*Primary Examiner* — Peter D Nolan
*Assistant Examiner* — Michael F Whalen
(74) *Attorney, Agent, or Firm* — Roach Brown McCarthy & Gruber, P.C.; Kevin D. McCarthy

(57) ABSTRACT

The present invention provides a method for decelerating and redirecting an airborne platform, comprising the steps of retaining a flexible airfoil in non-deployed form in controllably releasable secured relation with each corresponding rotor arm of a multi-rotor drone; and upon detecting rate of descent of said drone in a first direction to be greater than a predetermined value, triggering release of one or more of said retained airfoils from said corresponding rotor arm and causing each of said released airfoils to be circumferentially displaced from a first rotor arm to a second rotor arm of said drone to occlude an adjacent inter-arm region, wherein each of said circumferentially displaced airfoils generates a sufficient value of localized lift that causes said descending drone to change its direction of descent from said first direction to a second direction.

17 Claims, 12 Drawing Sheets

(51) Int. Cl.
*B64U 30/29* (2023.01)
*B64U 70/83* (2023.01)
*B64U 10/50* (2023.01)
*B64U 101/00* (2023.01)
*G05D 109/25* (2024.01)

(52) U.S. Cl.
CPC .......... *B64U 10/50* (2023.01); *B64U 2101/00* (2023.01); *G05D 2109/254* (2024.01)

(56) References Cited

U.S. PATENT DOCUMENTS

| | | | |
|---|---|---|---|
| 9,613,539 B1* | 4/2017 | Lindskog | ............... H02K 7/183 |
| 2007/0029439 A1 | 2/2007 | Merems et al. | |
| 2014/0343752 A1 | 11/2014 | Fisher et al. | |
| 2015/0314881 A1 | 11/2015 | Tsaliah et al. | |
| 2018/0244394 A1 | 8/2018 | Lee | |
| 2021/0261249 A1 | 8/2021 | Lee | |

FOREIGN PATENT DOCUMENTS

| | | | |
|---|---|---|---|
| CN | 105691606 A | | 6/2016 |
| CN | 104527976 B | | 11/2016 |
| CN | 106428577 | | 2/2017 |
| CN | 106950986 A | | 7/2017 |
| FR | 3062881 A1 | | 8/2018 |
| JP | 2001-120848 A | | 5/2001 |
| KR | 101609103 B1 | | 4/2016 |
| TW | 201332839 A2 | | 8/2013 |
| WO | 2015-39056 A1 | | 3/2015 |
| WO | 2016193690 A1 | | 12/2016 |
| WO | 2018173040 A1 | | 9/2018 |

* cited by examiner

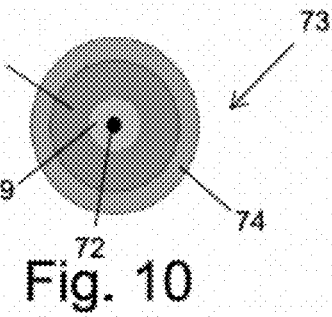
Fig. 10
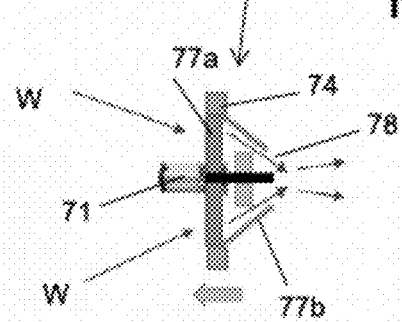
Fig. 11
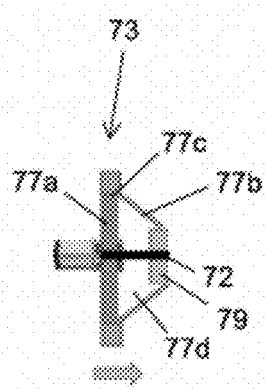
Fig. 12
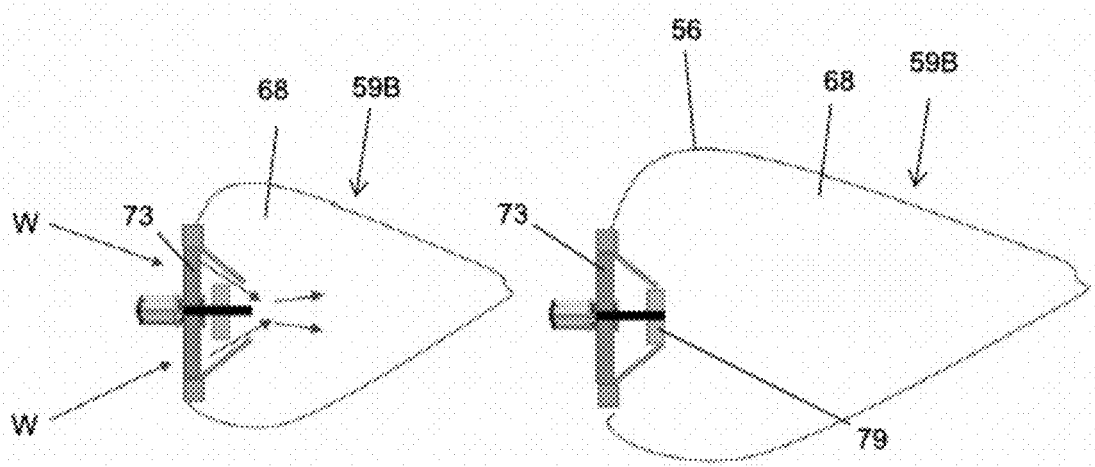
Fig. 13
Fig. 14

METHOD AND SYSTEM FOR DECELERATING AND REDIRECTING AN AIRBORNE PLATFORM

This is a continuation-in-part application of U.S. Ser. No. 16/492,327 filed on Sep. 9, 2019, which claims priority from international patent application no. PCT/IL2018/050303 filed on Mar. 15, 2018, which claims priority from Israeli patent application no. 251342 filed on Mar. 22, 2017.

FIELD OF THE INVENTION

The present invention relates to the field of multi-rotor aircraft, such as unmanned aerial vehicles (UAVs) and drones. More particularly, the invention relates to a method and system for decelerating and redirecting a platform of such aircraft.

BACKGROUND OF THE INVENTION

The use of drones and other types of multi-rotor aircraft has been steadily increasing in recent years, particularly for performance of autonomous missions such as pollution detection, aerial photography, and surveillance. At some times, due to the autonomous or semi-autonomous nature of the missions, an unforeseen collision occurs with the drone or the drone unexpectedly malfunctions, resulting in a rapid descent because of the inability of the drone to generate sufficient lift.

Some drones are equipped with an automatic parachute deployment system to decelerate the rapid descent of drones during such extenuating circumstances. However, these prior art parachute deployment systems merely decelerate the rate of fall, but do not control the direction of descent. There is therefore a significant risk that a plunging drone will collide with an underlying structure such as a building or a mountain, leading to irreparable and costly damage to the drone.

Also, the parachute size and weight of prior art drones is limited due to a maximum takeoff weight, and consequently the deceleration that is achievable thereby is also limited.

It is an object of the present invention to provide a multi-rotor aircraft with a decelerating system that is capable of controlling the direction of descent of the aircraft.

Other objects and advantages of the invention will become apparent as the description proceeds.

SUMMARY OF THE INVENTION

The present invention provides a method for decelerating and redirecting an airborne platform, comprising the steps of retaining a flexible airfoil in non-deployed form in controllably releasable secured relation with each corresponding arm of a circular platform; and upon detecting sensory data that is indicative of uncontrollable flight conditions, triggering release of one or more of said retained airfoils from said corresponding arm and causing each of said released airfoils to be circumferentially displaced from a first arm to a second arm of said platform to occlude an adjacent inter-arm region, wherein each of said circumferentially displaced airfoils generates a sufficient value of localized lift that causes said platform which is descending to change its direction of descent from a first direction to a second direction.

The release of the one or more retained airfoils from the corresponding arm may be triggered in response to detection of an underlying obstacle. All of the one or more retained airfoils may be released from the corresponding arm to ensure continued descent in the first direction if an obstacle is not found within a predetermined distance of a present location of the platform.

The present invention is also directed to a decelerating system for use in conjunction with an airborne platform, comprising a plurality of airfoils; an airfoil retainer for maintaining each of said airfoils in non-deployed form with respect to a corresponding radially extending arm of said platform; a securing element for controllably and releasably securing said airfoil to a corresponding platform arm; a displacement initiator for circumferentially displacing one or more of said airfoils, after being released from said retainer, from a first platform arm to a second platform arm to occlude an adjacent inter-arm region; and a motor for driving said displacement initiator In other embodiments, the decelerating system may further comprise any one of the following components:

A. one or more sensors for detecting predetermined rapid descent of the drone and a safety-ensuring processing unit in data communication with said one or more sensors, with the rotary ejector, and with each of the airfoil retainer securing elements, wherein a triggering signal to cause circumferential displacement of the one or more of the airfoils is transmitted from said safety-ensuring processing unit to said ejector and to those securing elements corresponding to the one or more airfoils in response to detection of said predetermined rapid descent;

B. a corresponding interface element in data communication with the safety-ensuring processing unit that is controllably extendible from the ejector to each of the airfoils, wherein engagement of an extended interface element with an airfoil portion causes the corresponding airfoil to be circumferentially displaced to occlude the adjacent inter-arm region during rotation of the ejector;

C. a collision avoidance system in data communication with the safety-ensuring processing unit for transmitting a detection signal to the safety-ensuring processing unit upon detecting an obstacle along an uncorrected descent path in a first direction of the drone, wherein the safety-ensuring processing unit is operable to calculate a required direction of descent in order to avoid said obstacle and to cause a sufficient number of the airfoils, following transmission of the triggering signals, to become circumferentially displaced, each of said circumferentially displaced airfoils generates a sufficient value of localized lift that causes said descending drone to change its direction of descent from said first direction to a second direction which is suitable to avoid said obstacle; and D. planform adjusting means for each airfoil that is responsive to the transmission of the triggering signal and to the circumferential displacement of the one or more airfoils.

In one aspect, the safety-ensuring processing unit is an onboard computer.

A selectively inflatable and circumferentially displaceable airfoil capable of occluding a corresponding inter-arm region of a circular platform comprises a plurality of radially extending arms and directing said circular platform when unpropelled to a specific landing area, said airfoil comprising a two-layered fabric defining an interior therebetween and formed with one or more openings; a valve seat irremovably secured to said fabric at each of said openings; and an inflating unit sealingly engageable with a corresponding valve seat which, when actuated, is configured to inject a suitable amount of a pressurized gas into said airfoil interior to a pressure that prevents airfoil wobbling when said platform is being directed to said specific landing area.

BRIEF DESCRIPTION OF THE DRAWINGS

In the drawings:

FIG. 10 is a rear view of a valve operatively connectable to an airfoil according to another embodiment;

FIGS. 11 and 12 are a side view of the valve of FIG. 10, shown when its valve element is unseated and seated, respectively;

FIGS. 13 and 14 are a vertical cross sectional view of an airfoil to which the valve of FIG. 10 is operatively connected, showing the valve when its valve element is unseated and seated with respect to a valve seat, respectively;

DETAILED DESCRIPTION OF PREFERRED EMBODIMENTS

A drone is configured with many sophisticated systems to support semi-autonomous missions performable by remote control or even fully autonomous missions, including a propulsion system, communication system, control system, collision avoidance system and power system. The loss of the drone is imminent upon failure of any one of these systems.

To minimize damage to the drone as a result of a system failure and to nearby structures following a drone caused collision, a safety-ensuring processing unit embodied by the onboard drone computer or a dedicated remote computer activates a decelerating system upon detection of rapid descent of the drone, for example after surpassing a predetermined threshold, to decelerate the rate of descent. The rotor based propulsion system, if employed, is automatically deactivated to prevent damage to the decelerating system. During decelerating system assisted descent, the drone is subjected to wind drifts and the influence of gravity, and is therefore directed along an uncontrollable path until landing, or unfortunately colliding with a structure located along its path.

In order to avoid a collision between a drone and a structure during decelerating system assisted descent, the decelerating system of the present invention in conjunction with the safety-ensuring processing unit is capable of controlling the direction of descent of the drone.

In another embodiment, the decelerating system is mounted on another type of airborne platform, such as an aerial delivery parachute, to control its direction of descent.

Figure 1:
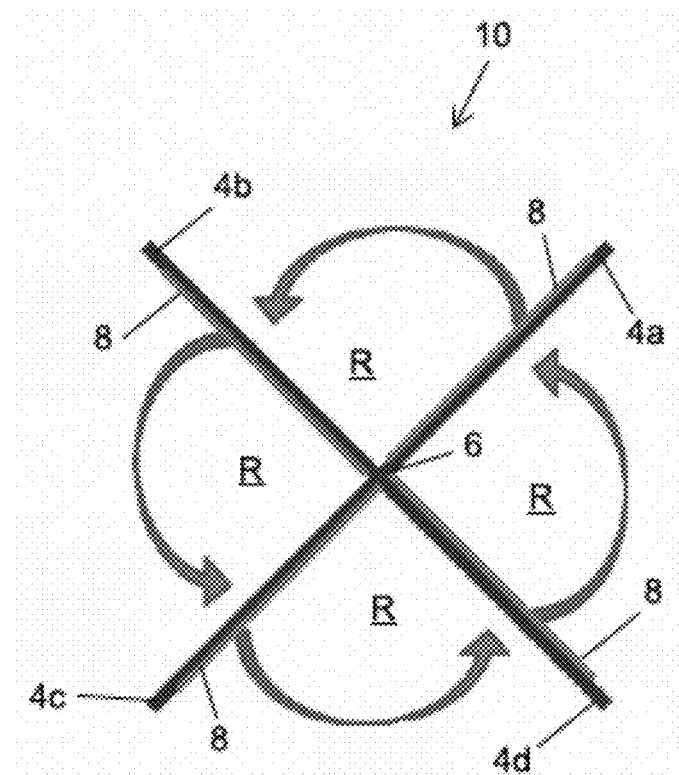
FIG. 1 is a schematic plan view of a multi-rotor drone according to one embodiment of the invention, illustrating selected inter-arm regions being occluded by corresponding circumferentially displaced airfoils.

As shown in FIG. 1, the type of drone that is suitable for one embodiment of the present invention is the multi-rotor type wherein a rotor is carried by the radial outward end, or a portion proximate to the end, of each corresponding rotor arm. Each rotor is independently rotatable and controllable to achieve a desired resultant drone thrust and a desired resultant drone moment.

The schematically illustrated multi-rotor drone 10 is shown to have four rotor arms 4a-d that extends radially outwardly from a central hub 6, or from any other central region of convergence, to define a normally unobstructed inter-arm region R by two adjacent rotor arms 4. It will be appreciated that the invention is similarly applicable to a drone having any other number of rotor arms.

As opposed to prior art decelerating systems that comprise only a single parachute for the entire drone, the decelerating system of the present invention comprises a plurality of airfoils, one for each rotor arm. Following generation of a triggering signal by the safety-ensuring processing unit in response to detection of predetermined rapid descent of the drone, one or more inflatable airfoils are forcibly circumferentially displaced in the same rotational direction, from one rotor arm 4 to another, in order to occlude the adjacent inter-arm region R. Following occlusion of each selected inter-arm region R, the occluding airfoil becomes expanded to generate lift and to thereby decelerate the rate of descent of the drone.

An airfoil retainer 8 for maintaining an airfoil in compact, non-deployed form is provided with each rotor arm 4. The airfoil is preferably, but not necessarily, made of flexible and lightweight nonporous material. Airfoil retainer 8 may be embodied by a canister that has one opening facing an adjacent inter-arm region R and one or more elements for controllably and releasably securing the airfoil to a closed wall of the canister. In one embodiment, airfoil retainer 8 comprises one or more attachment elements for controllably and releasably securing the inflatable airfoil externally to a corresponding rotor arm 4.

Figure 2:
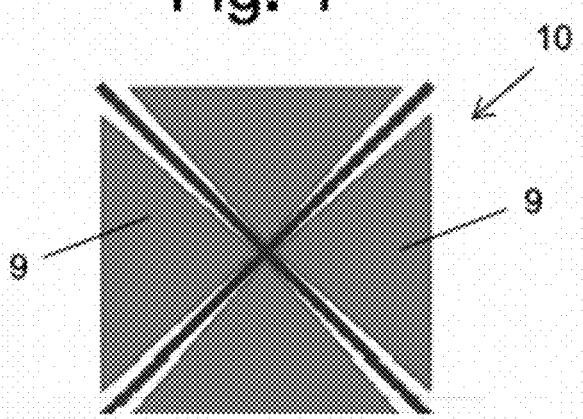
FIG. 2 is a schematic plan view of the drone of FIG. 1, the airfoils thereof shown in a fully deployed condition.

By employing a plurality of independently displaceable inflatable airfoils, the rate and direction of lift may be advantageously controlled. When all inflatable airfoils 9 are deployed as shown in FIG. 2, the combined lift is vertically directed and the descending drone 10 proceeds along its downward path in a substantially vertical direction, albeit at a slower rate, which is influenced only by sideward wind drifts. However when one or more of the inflatable airfoils 9 are not deployed, the drone ceases to become balanced and changes its direction of descent in order to avoid, for example, an underlying structure that is liable to afflict significant damage to the drone or to bystanders upon collision with the drone.

Figure 3:
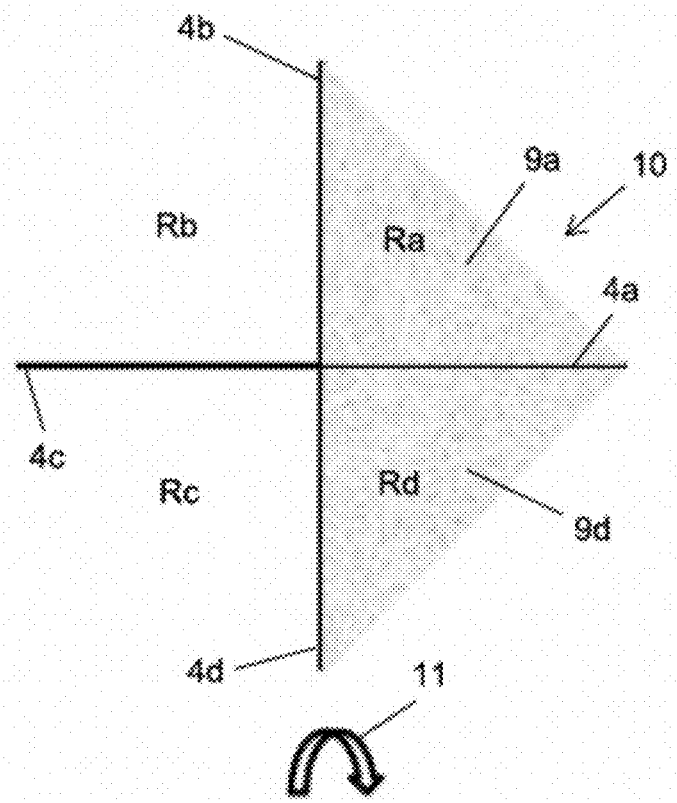
FIG. 3 is a schematic plan view of the drone of FIG. 1, two airfoils thereof shown in a fully deployed condition to cause the drone to rotate about the pitch axis.

For example, as shown in FIG. 3, drone 10 is caused to rotate in the direction indicated by arrow 11 about the pitch axis defined by rotor arms 4b and 4d when inflatable airfoils 9a and 9d are deployed to occlude regions $R_a$ and $R_d$, respectively, due to the increased lift localized at regions $R_a$ and $R_d$ relative to the diametrically opposite regions regions $R_b$ and $R_c$. Thus in combination with the downward pull of gravity, drone 10 will be forced to undergo a leftward movement in accordance with the illustrated orientation.

Figure 4:
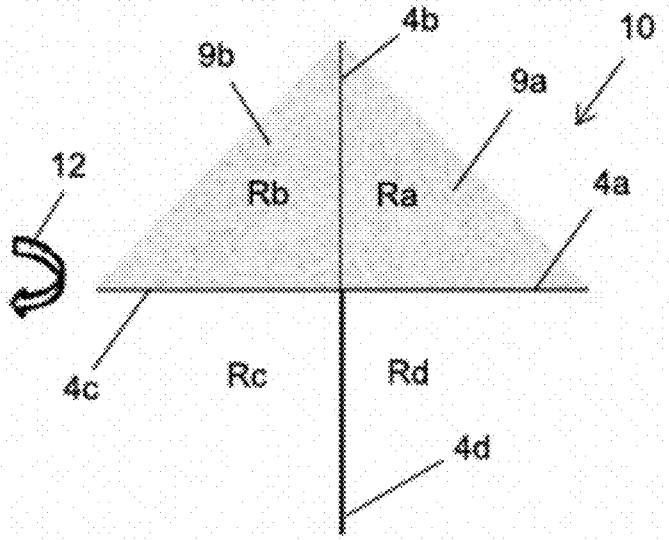
FIG. 4 is a schematic plan view of the drone of FIG. 1, two airfoils thereof shown in a fully deployed condition to cause the drone to rotate about the roll axis.

Alternatively, as shown in FIG. 4, drone 10 is caused to rotate in the direction indicated by arrow 12 about the roll axis defined by rotor arms 4a and 4c when inflatable airfoils 9a and 9b are deployed to occlude regions $R_a$ and $R_b$, respectively, due to the increased lift localized at regions $R_a$ and $R_b$ relative to the diametrically opposite regions regions $R_c$ and $R_d$. Thus in combination with the downward pull of gravity, drone 10 will be forced to undergo a rightward movement in accordance with the illustrated orientation.

FIGS. 5A-D schematically illustrate the operation of drone 10 during a redirection operation in conjunction with a deceleration system.

Figure 5A:
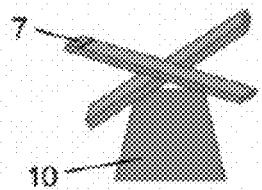
FIGS. 5A-D is a schematic illustration of four stages, respectively, of a redirection operation performed in conjunction with a deceleration system of a multi-rotor drone.

During normal flight whereby all airfoils are undeployed as shown in FIG. 5A, one or more rotors that generate thrust or lift are driven by corresponding battery-powered motors, e.g. brushless motors, or by any other suitable propulsion system 7. A motor based propulsion system 7 comprises an electronic speed controller (ESC), which, upon receiving a suitable signal from the processing unit, causes the voltage to the motor to be raised or lowered to maintain motor speed under the dynamic load of a propeller carried by a rotor, change the speed of the propeller, or to deactivate the motor. The balanced drone 10 is allowed to hover when the rotors produce a lift force equal to the gravitational force.

Figure 5B:
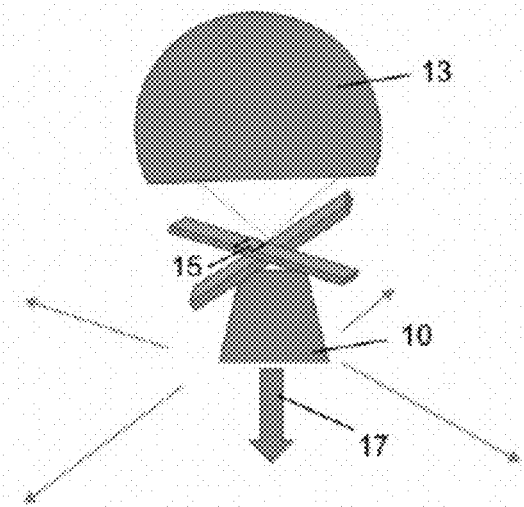
Figure 5B:
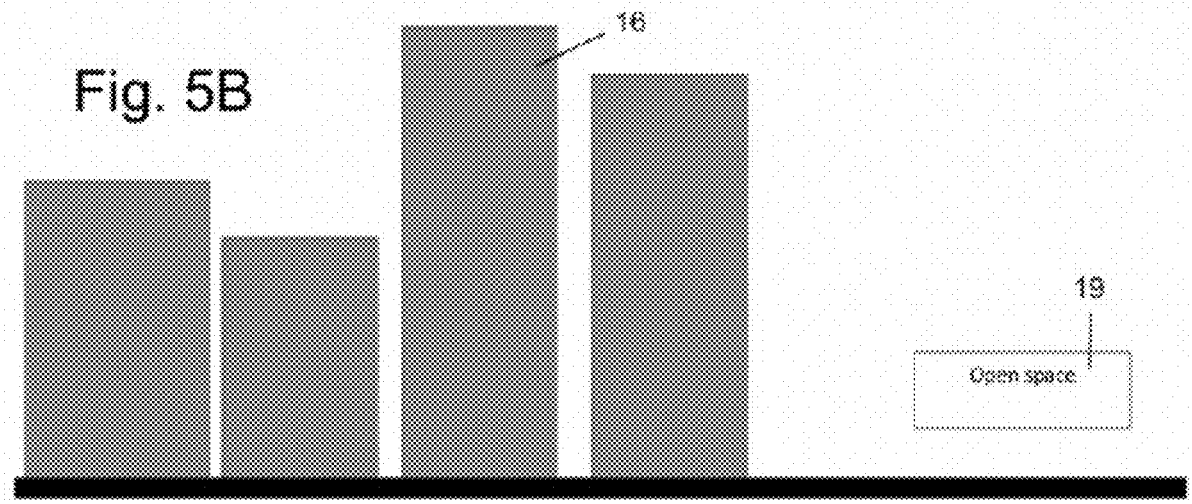

If drone 10 experiences a malfunction, for example a malfunction in one of its rotor motors or a battery failure, unstable flight becomes noticeable, and a parachute 13 is consequently deployed by means of parachute deployment system 15 as shown in FIG. 5B. Drone 10 undergoes a free fall through the influence of gravity when its rotors stop spinning, often reaching a speed of 15-19 m/s. The main utility of a deployed parachute is to significantly decrease the speed of the falling drone. A secondary function of a deployed parachute is to maintain drone stability.

Parachute 13 may be deployed by a mortar system using the force of compressed gas, by aerodynamic deployment using the drag force of a pilot chute to pull out the parachute, during the generation of pressurized gas that propels a plurality of projectiles attached to undeployed parachute fabric as described in U.S. Pat. No. 11,286,053 the contents of which are incorporated herein by reference, or by other means well known to those skilled in the art. Although parachute 13 helps to decelerate the rapid descent of drone 10, the drone nevertheless descends at a relatively high speed, e.g. 7 m/s, in an uncontrollable manner while being driven by side winds. Winds and angular motion of the platform can affect the final descent speed. Also, the speed of descent is greatly influenced by the surface area of the airfoil that is perpendicular to the downward direction and by the weight carrying capacity of the drone.

Parachute deployment system 15 is activated in response to a signal transmitted thereto by the processing unit, generally in response to the detection of a predetermined component malfunction or failure. Motor based propulsion system 7 may be configured to deactivate all of the propulsion system motors in response to the transmission of a parachute deployment signal by isolating the flow of current to each motor, neutralizing the operation of the ESC so that each motor is prevented from receiving an activation signal, or by transmitting a deactivation signal.

Figure 5C:
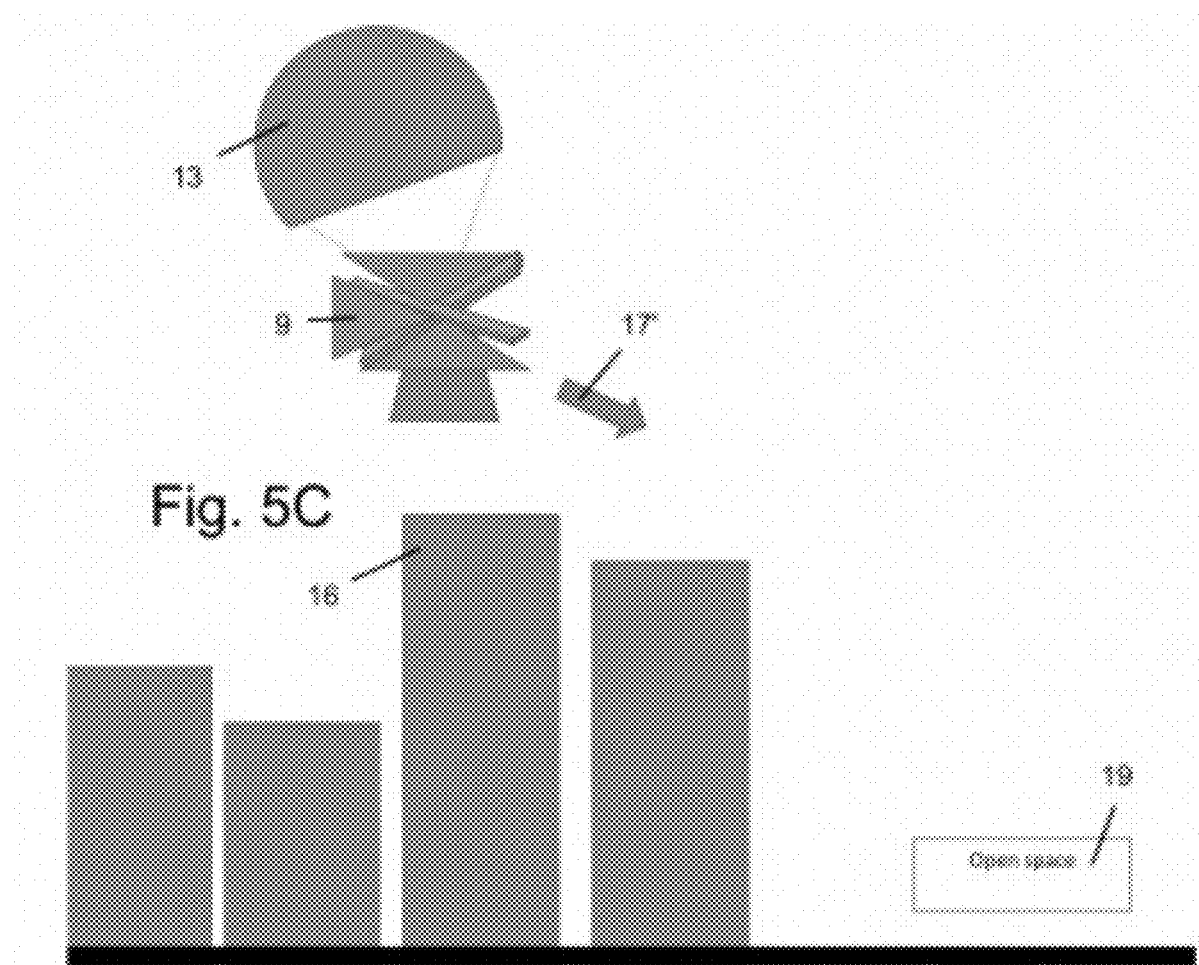

As drone 10 descends, the safety-ensuring processing unit detects obstacles such as buildings 16 located along an uncorrected descent path 17 of the drone and additionally determines that the descent speed is excessively fast for collision-free descent. The safety-ensuring processing unit accordingly commands the deceleration system to deploy three or any other suitable number of inflatable airfoils 9, to reduce the descent speed, e.g. to 6 m/s, and to direct drone 10 along corrected descent path 17' to an open area 19 such as a soccer field, as shown in FIG. 5C. The location of open area 19 is determined by the safety-ensuring processing unit using image processing means. Alternatively, drone 10 may be urged to be slightly redirected along corrected descent path 17' by selectively adjusting the planform, i.e. projected area of an airfoil, when viewed from above. Since lift is directly proportional to the airfoil planform area, the lift acting on a given airfoil may be controlled by adjusting the planform, for example by inflating or deflating the airfoil or by repositioning a portion of the airfoil, such as the angle of the radially inward tip of the airfoil with respect to the horizontal plane. Thus drone 10 will be caused to be redirected by adjusting the difference in lift acting on two different airfoils. The direction to which drone 10 is redirected may be more accurately controlled when all airfoils are deployed, and the planform of each airfoil is different.

Figure 5D:
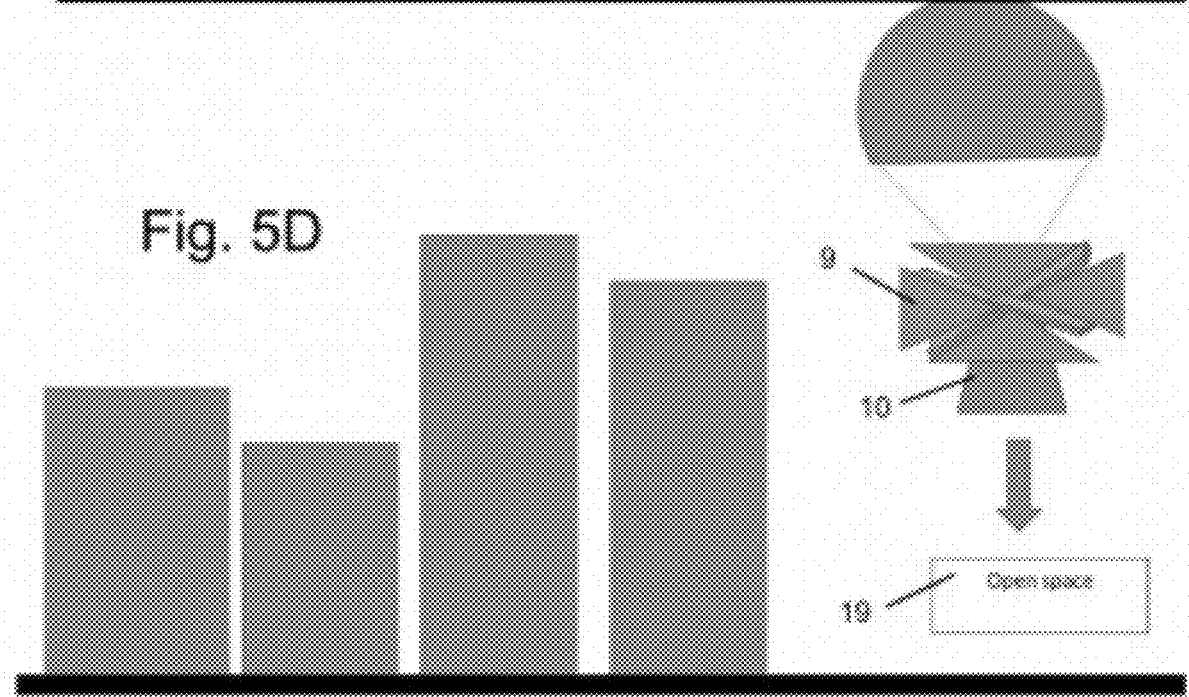

During the course of the redirection operation when drone 10 overlies the desired open area 19, as shown in FIG. 5D, the safety-ensuring processing unit commands the deceleration system to deploy all airfoils 9 including the remaining number of previously undeployed airfoils, so that the descent speed will be additionally reduced, e.g. to 5 m/s, until the drone will be able to safely land at open area 19.

Figure 5E:
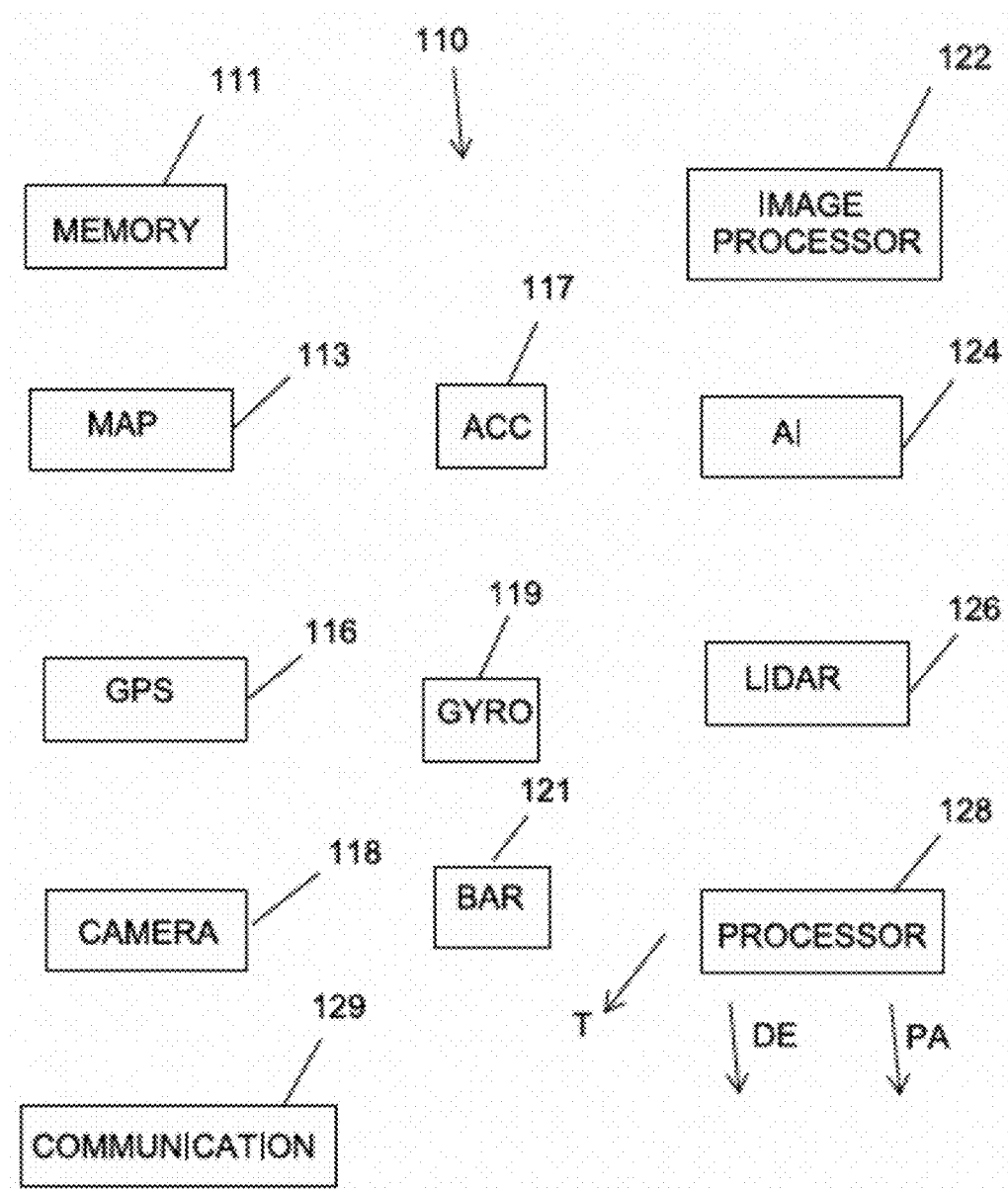
FIG. 5E is a block diagram of components of an embodiment of a safety-ensuring processing unit which is configured to provide reliable redirection operations.

A safety-ensuring processing unit 110 schematically illustrated in FIG. 5E according to one embodiment is configured to provide reliable redirection operations.

Safety-ensuring processing unit 110 comprises a memory 111 in which is stored a desired flight plan, a map module 113 which is loaded with one or maps associated with the desired flight plan, a GPS module 116 for determining a real-time drone location, and a digital camera 118, e.g. a stereoscopic camera, for capturing images in the vicinity of the real-time drone location. An image processor 122 receives data from GPS module 116 and digital camera 118, and determines the presence of underlying obstacles by processing the images in accordance with trained artificial intelligence (AI) module 124. A lidar sensor 126 determines the real-time altitude of the drone above the detected obstacles with respect to the uncorrected descent path corresponding to the stored flight plan and also the range to an open area identified by AI module 124. Since the deployed parachute serves to maintain drone stability and to prevent the falling drone from overturning, the rotors of the multirotor drone are ensured of remaining positioned above an underside of the drone and camera 118 and lidar sensor 126, which extend downwardly from the drone underside or from an attachment extending downwardly from the drone underside, are ensured of remaining positioned below the rotors and of scanning objects underlying the drone.

Another processor 128, for example a microcontroller, or even the same image processor 122, is able to recalculate the descent path to the identified open area in accordance with data received from AI module 124 and lidar sensor 126. After processor 128 computes the recalculated direction of descent, it transmits a deployment signal DE to the deceleration system. Processor 128 also transmits a parachute deployment signal PA to the parachute deployment system following generation of a triggering signal. Communication module 129, which may support 5G wireless technology and interfacing with AI module 124, facilitates the data exchange carried out with processing unit 110.

AI module 124 may also be instrumental in defining when a trigger signal T for initiating release of one or more airfoils from a corresponding rotor arm will be generated, to mitigate the effect of an uncontrolled descent. Trigger signal T may be generated in response to sensory data detected by an accelerator 117 that is indicative of a sudden fall. At times, the drone undergoes maneuvers during a normal controlled flight which are accompanied by side winds that result in a predetermined acceleration. To avoid generation of a false trigger signal due to the detection of the predetermined acceleration, AI module 124 may be trained with a model that is reflective of a dedicated algorithm that takes into account other sensory data in addition to gravity-caused acceleration along the z-axis, such as angular acceleration detected by gyroscope 119 or an angular acceleration sensor, and atmospheric pressure detected by barometer sensor 121. Each aircraft whether self-propelled or not, which may also be referred to as a "platform", is different, having a different center of mass, different rotors, different types of motors, and different aerodynamic characteristics. For trigger signal generation, the detected sensory data is input to AI module 124 and the output data, which may be synthesized data such as a score based on the input data and the dedicated algorithm, is indicative of whether a trigger signal should be generated due to uncontrollable flight conditions or whether the detected sensory data is indicative of normative flight conditions.

Processing unit 110 is able to set the drone in a parachute deployment mode or in an airfoil deployment mode. When AI module 124 determines that there are not any obstacles underlying the drone, and the stored flight plan does not require the drone to land at a specific landing space, the trigger signal indicative of uncontrollable flight initiates the parachute deployment mode. When AI module 124 determines the presence of underlying obstacles, generation of the trigger signal initiates the airfoil deployment mode whereby both the parachute and at least one airfoil are deployed. Alternatively or in addition, the parachute deployment mode may be initiated when the drone descends at a rate ranging from 4-7 m/s and the airfoil deployment mode may be initiated when the drone descends at a rate of at least 4 m/s. Of course, the airfoil deployment mode will also be initiated when it is determined that the drone should be directed to a specific open area.

Figure 6:
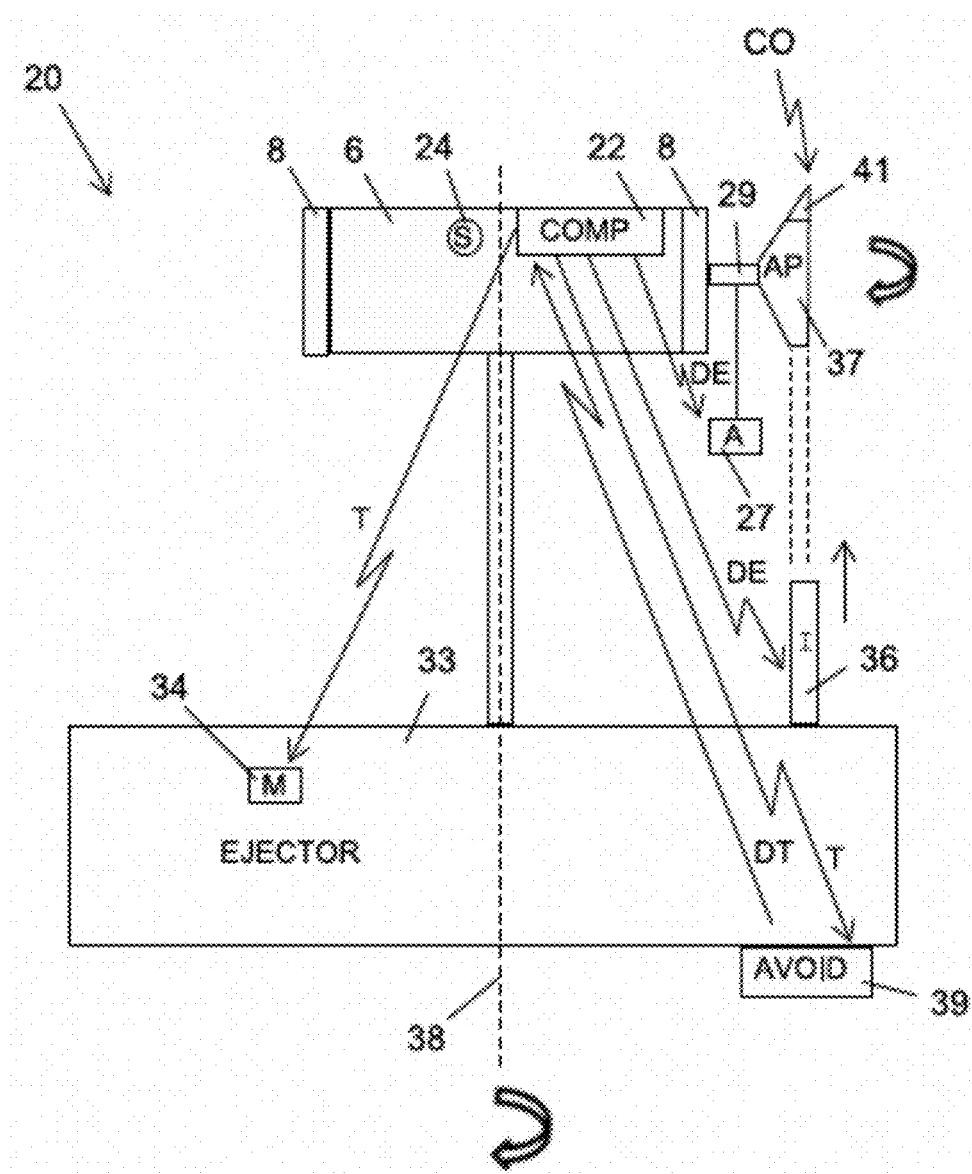
FIG. 6 is a schematic illustration of a deceleration system according to one embodiment of the invention.

FIG. 6 schematically illustrates a deceleration system 20 according to one embodiment of the invention. Deceleration system 20 comprises onboard computer 22 for coordinating transmission of the control signals which generally comprises many or all of the components of processing unit 110, or is in data communication with these components. Deceleration system 20 additionally comprises one or more sensors 24 in data communication with computer 22 for detecting predetermined rapid descent of the drone, and an actuator 27 in data communication with onboard computer 22 for a releasable airfoil retainer securing element 29. Computer 22 transmits a signal, whether a wired or wireless signal, to each selected actuator 27 following detection of the predetermined rapid descent of the drone, to initiate release of a corresponding securing element 29 from its airfoil retainer 8.

Deceleration system 20 may also comprise a rotary airfoil ejector 33 that is located below, and possibly connected to, the convergence region 6 of the rotor arms. For this embodiment, a deployed airfoil may be shaped at an upper region as a quarter-circle to occlude a corresponding inter-arm region, or any other fraction of a circle depending on the number of rotor arms, and at a lower region with a significantly reduced surface area, to facilitate windability and extendibility. Deceleration system 20 may also comprise a retractable interface element 36, such as a spring loaded interface element, that is controllably extendible from ejector 33 to a corresponding airfoil portion (AP) 37, and a controllable coupling element 41. A downwardly facing collision avoidance system 39 is also in data communication with computer 22.

In operation, a triggering signal T is transmitted simultaneously to the motor 34 of ejector 33 that generates the rotary motion and to collision avoidance system 39. If collision avoidance system 39 detects an obstacle located along the uncorrected descent path of the drone, for example within a predetermined distance, a detection signal DT is transmitted to computer 22, and the latter calculates in response the direction of descent that is needed in order to avoid the detected obstacle. The rate of circumferential displacement of airfoil portion 37 may be increased if an obstacle is in relatively close proximity. If an obstacle has not been detected, all airfoils are simultaneously deployed so that the combined lift will be vertically directed and the drone will continue its downward descent.

After computer 22 computes the required direction of descent, it transmits a deployment signal DE simultaneously to the actuator 27 of airfoil retainer securing element 29 and to the interface element 36 associated with those selected airfoils that are needed to be deployed in order to generate the necessary directional lift for ensuring the required direction of descent. Extension of a selected interface element 36 is synchronized to be carried out at a time slightly following release of the corresponding securing element 29. The extended interface element 36 is adapted to become engaged with a corresponding airfoil portion 37 adjacent to the released securing element 29, for example by means of dedicated engagement elements that may be actuated.

Since ejector 33 has been caused to rotate at a predetermined rate about its central axis 38 and the extended interface element 36 has become engaged with a corresponding airfoil portion 37, airfoil portion 37 is forced to be circumferentially displaced from a first rotor arm with which airfoil retainer 8 has been provided, in order to occlude the adjacent inter-arm region. At the end of the circumferential displacement of the airfoil, airfoil-connected coupling element 41 is actuated following transmission of a coupling signal CO and is then secured to the second rotor arm to enable the lift generating capabilities of the airfoil.

Deceleration system 20 may be sufficiently quick reacting so as to generate lift by deploying a selected number of airfoils and thereby correcting the direction of descent within 0.3 sec, or any other suitable period of time, after detection of the underlying obstacle.

Deceleration system 20 may also comprise planform adjusting means for each airfoil that is responsive to triggering signal T.

It will be appreciated that the inflated airfoils may be deployed in response to a remotely controlled action which is controlled by a dedicated remote computer constituting the safety-ensuring processing unit, to coordinate transmission of the control signals and to cause one or more of the airfoils to be circumferentially displaced or planform-adjusted in response to detection of an underlying obstacle.

FIGS. 7-20 illustrate another embodiment of a deceleration system, indicated generally by numeral 50. In this embodiment, each airfoil 59, which comprises a plurality of serially interconnected and inflatable cells 64, is foldable and is connected to a corresponding rotor arm 4 of a drone 60 and to a pivotal displacement initiator 72 adjoining the adjacent inter-arm region R. Each airfoil 59, when set to an undeployed position, is retained in a folded condition within an unobstructed cartridge 63. Airfoil 59 becomes unfolded and circumferentially displaced to occlude inter-arm region R when displacement initiator 72 is pivoted from a first arm, e.g. the illustrated rotor arm 4a, to a second arm adjacent to the first arm, e.g. the illustrated rotor arm 4b.

Figure 7:
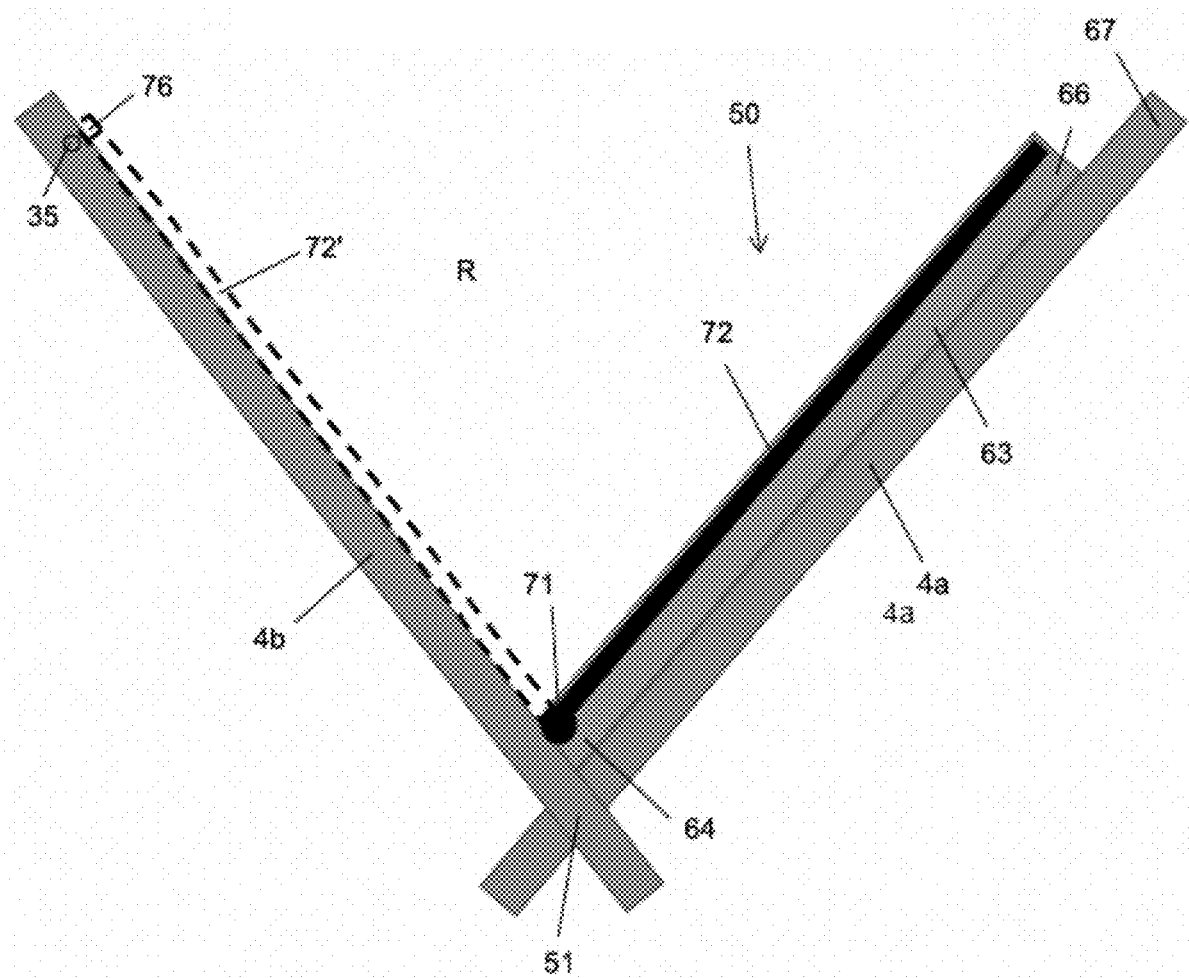
FIG. 7 is a plan view of a portion of a multi-rotor drone and of corresponding apparatus of a deceleration system according to another embodiment, schematically illustrating a displacement initiator in two angular positions while being shown when unattached to an airfoil.

As shown in FIG. 7, cartridge 63, which may have a U-shaped configuration, is connected completely such as by welding to rotor arm 4a and extends radially outwardly from region 51 of arm convergence to a cartridge terminal end 66 that is spaced radially inwardly from the terminal end 67 of rotor arm 4a, to accommodate the positioning of a rotor to be carried by rotor arm 4a in the space between terminal ends 66 and 67. The radially inward end 64 of cartridge 63 is also connected to rotor arm 4b proximate to region 51 of convergence.

Figure 15:
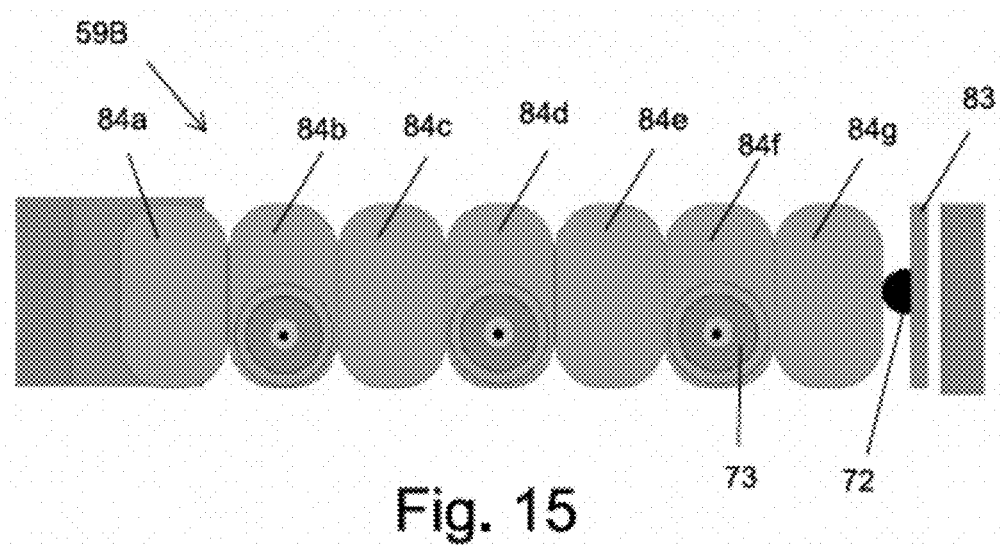
FIG. 15 is a vertical cross sectional view cut through the airfoil of FIG. 14, shown when deployed and inflated.
Figure 20:
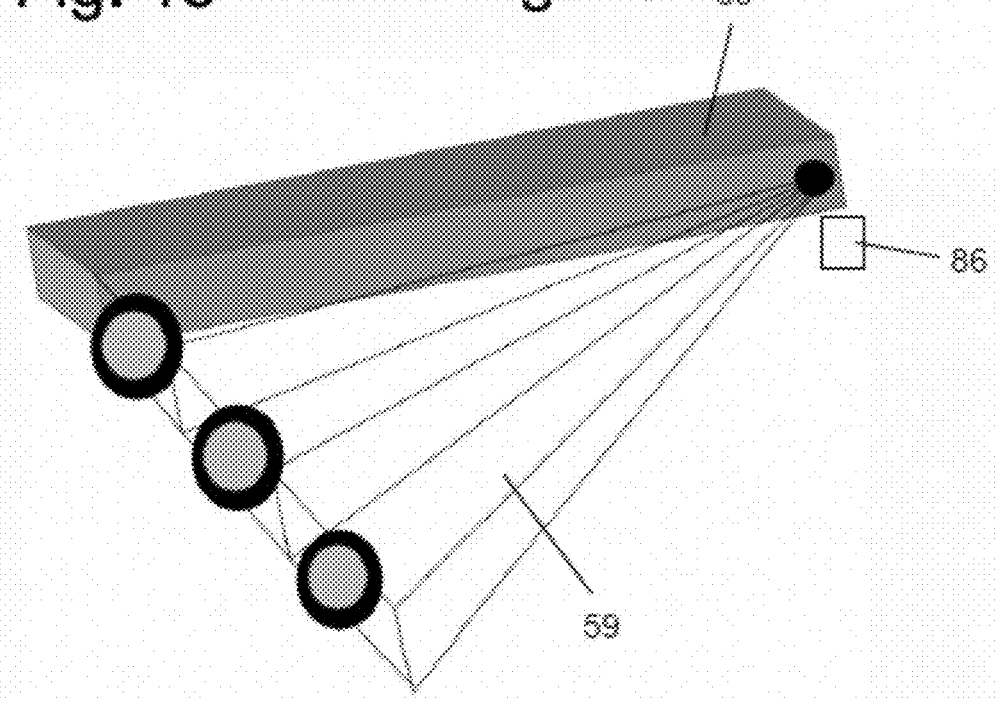
FIG. 20 is a perspective view from above of a portion of the deceleration system, showing the airfoil of FIG. 13 being deployed.

Displacement initiator 72 is an elongated element having a length substantially equal to that of, and generally less than, cartridge 63. Displacement initiator 72 may be a metallic rod, such as made of aluminum or carbon steel, or alternatively may be a metallic board adapted to cover the opening of cartridge 63, when set to an undeployed position. When displacement initiator 72 is a rod, a cover 83 for occluding the cartridge interior is fixedly connected to the rod as shown in FIG. 15. The output shaft of a dedicated motor 86, e.g. a stepper motor, is connected to and rotatably drives the radially inward end 71 of displacement initiator 72, transmitting sufficient torque to facilitate pivotal displacement of the displacement initiator and of the airfoil connected thereto from rotor arm 4a to rotor arm 4b, or from rotor arm 4b to rotor arm 4a. Motor 86 may be mounted below the bottom surface of cartridge 63 as shown in FIG. 20.

A schematically illustrated securing element 76 such as a magnet or a latch is provided at a radially outward region of displacement initiator 72. Displacement initiator 72 is secured by securing element 76 to an adjacent securable region 35 of the second arm 4b, after having been set to the deployed position. An actuator associated with securing element 76, such as a mechanical or an electromechanical actuator in data communication with processor 128 (FIG. 5E), may be employed to activate an active securing element such as a latch, after displacement initiator 72 has been set to the deployed position 72' indicated by dashed lines. It will be appreciated that securing element 29 of FIG. 6 may be configured similarly as securing element 76.

Figure 8:
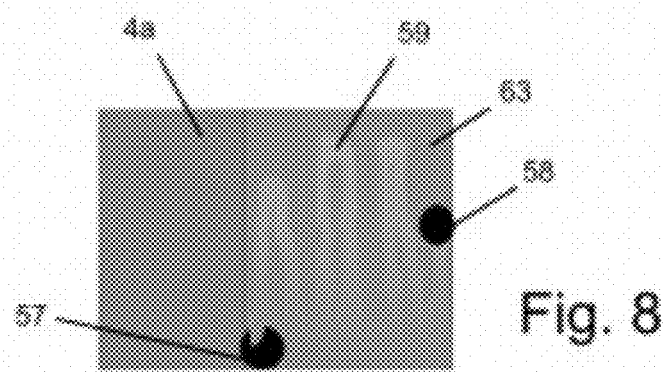
FIG. 8 is a vertical cross sectional view cut through one rotor arm of the multi-rotor drone of FIG. 7 and corresponding apparatus, showing an airfoil in a folded condition without the displacement initiator.

One radial end of airfoil 59, which is shown in FIG. 8 to be in a folded condition while being retained within cartridge 63, is permanently and completely connected by the schematically illustrated connection means 57 to the corresponding rotor arm 4a and the other radial end is permanently and completely connected to the corresponding displacement initiator 72 by the schematically illustrated connection means 58. Connection means 57 and 58 may be an adhesive such as an elastic adhesive or a flexible epoxy. Airfoil 59 consequently becomes unfolded to occlude the inter-arm region as shown in FIG. 20 when the displacement initiator is driven to the deployed position.

This arrangement of circumferentially displaceable airfoils is advantageous in many ways. Firstly, the circumferentially displaceable airfoils that completely occlude a corresponding inter-arm region promote good airflow characteristics generated by the drone, allowing a generated airstream to flow completely along the airfoil without the presence of air stagnation pockets that would result in localized instability.

Figures 16, 17:
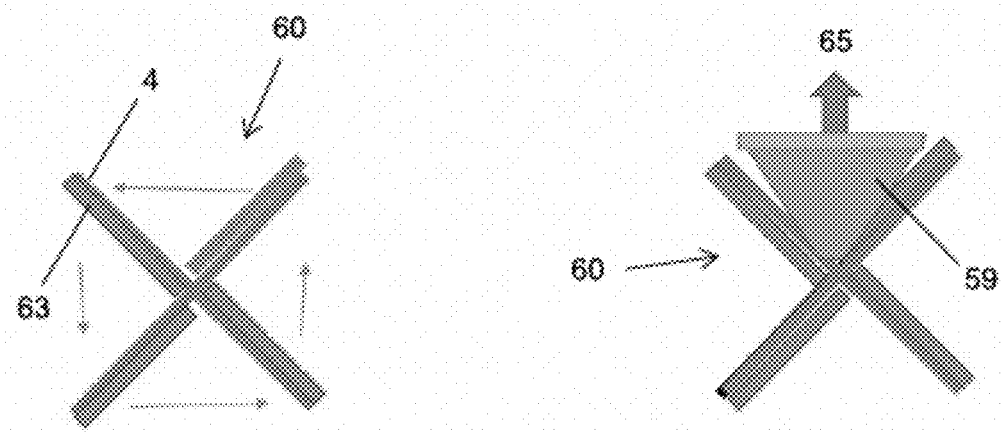
FIG. 16 is a plan view of a multi-rotor drone used in conjunction with the deceleration system of FIG. 7 that is shown without the rotors and when the airfoils are undeployed, schematically illustrating its radial symmetry.
FIG. 17 is a plan view of the drone of FIG. 16 when a single airfoil is deployed, schematically illustrating drone directivity.

Secondly as shown in FIG. 16, multi-drone 60 configured with a plurality of radially extending rotor arms 4 and with a plurality of cartridges 63, each attached to the same side of a corresponding rotor arm, has radial symmetry and is therefore balanced.

Thirdly as shown in FIG. 17, multi-drone 60 is afforded directivity during operation of the deceleration system. When one airfoil 59 is deployed as shown, localized lift is generated only at the single deployed airfoil. While the entire drone is rapidly descending, the localized lift acts at the single deployed airfoil to urge the descending drone 60 in the illustrated direction 65 that is radially outwardly from the deployed airfoil 59. Likewise when three airfoils are deployed as shown in FIG. 5C, the lift localized at the two diagonally opposite airfoils is offset and the drone descends in the direction of the other airfoil that lacks a counterpart airfoil.

Additionally, circumferentially displaceable airfoils are suitable for use on a multi-rotor drone of circular configuration, which is able to be accurately directed to a specific landing location, particularly when the airfoils are suitably inflated to prevent the drone from wobbling while descending.

Figure 9A:
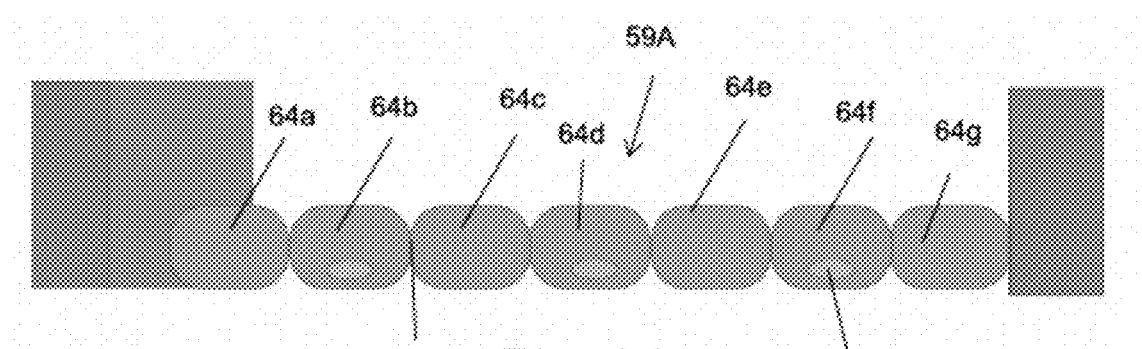
FIGS. 9A and 9B are a vertical cross sectional view cut through a deployed airfoil according to one embodiment, shown in uninflated and inflated conditions, respectively.
Figure 9B:
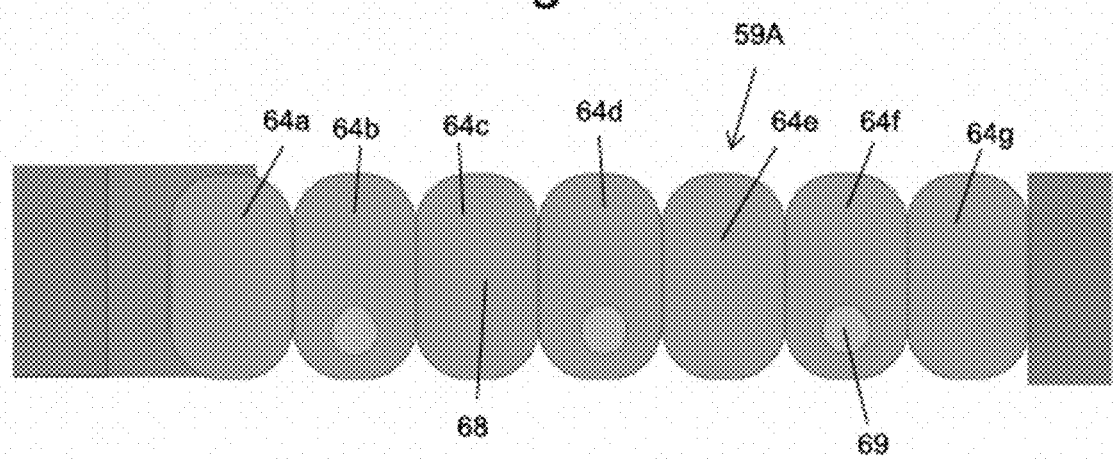

One embodiment of airfoil 59A is illustrated in FIGS. 9A-B. Airfoil 59A comprising a plurality of serially interconnected cells 64a-g may be made of nylon by virtue of its light weight and good wind resistance and elasticity. Three cells 64b, 64d and 64f, or any other desired number of cells, are formed with an opening 69 through which ambient air is flowable unrestrictedly. An appreciably high flow rate of wind is introduced into the openings 69 when the drone undergoes a free fall, to provide airfoil 59A with substantially high rigidity. The cells are shown in FIG. 9A when uninflated and in FIG. 9B when inflated.

Each elongated cell of airfoil 59A may be comprised of upper and lower skins of fabric to define an air flow chamber 68 therebetween along which ambient air is able to flow longitudinally, or along the length of a cell. Alternatively, each cell may be comprised of a single skin of fabric. Adjacent cells are interconnected such as by adhesion or fusion, and one or more apertures are formed in an interconnected wall 61 to facilitate air flow transversally from one cell to another.

Another embodiment of an airfoil 59B with serially interconnected cells is illustrated in FIGS. 10-15. In this embodiment, a valve 73 is operatively connected to the airfoil at a corresponding opening formed in each of cells 84*b*, 84*d* and 84*f*, for example, to selectively prevent the outward discharge of pressurized gas contained within the airfoil interior and to thereby increase airfoil stability.

Airfoil 59B comprising a plurality of serially interconnected cells 84*a-g* may be made of a strong fabric 56, such as Nylon 66 or Dyneema Composite Fabric (DCF), also known as Cuben Fiber (CTF3), for use in high-strength, low-weight applications such as holding pressurized air for prolonged periods of time.

Valve 73 comprises valve seat 77, outer airfoil fabric retaining ring 74, and axially displaceable annular valve element 79. Valve element 79 is driven by motor 71 that is mounted externally onto the annular wall 77*a* of valve seat 77 functioning as a stationary support that adjoins ring 74. The inner wall surrounding the central bore of valve element 79 is threadedly engaged with the output shaft 72 of motor 71, or with a threaded bar connected to the output shaft.

Valve seat 77 has a frusto-conical wall 77*b* that extends obliquely from the radially outward edge 77*c* of annular wall 77*a* to a sufficient axial distance from annular wall 77*a* that defines a central circular opening 78 within which valve element 79 is seatable. Depending on the direction of rotation of output shaft 72 during operation of motor 71, valve element 79 is selectively movable into and out of sealing engagement with valve seat 77. Valve element 79 is positioned within the interior 77*d* of valve seat 77 that is interiorly spaced to frusto-conical wall 77*b* when valve element 79 is moved out of sealing engagement with valve seat 77. Wind W, or other ambient air, is introducible through valve 73, via the clearance between output shaft 72 and the central bore of wall 77*a*, to air flow chamber 68 when valve element 79 is unseated, as shown in FIGS. 11 and 13, and is retained within air flow chamber 68 when valve element 79 is seated and airfoil 59B is inflated, as shown in FIGS. 12 and 14.

Valve 73 may be configured to resist introduction of additional air into the airfoil interior after the air pressure achieves a predetermined value, for example it may become closed after a second.

Airfoil fabric 56 is retained by a friction fit between the small interspace between outer ring 74 and annular wall 77*a* of valve seat 77. For example, the outer diameter of annular wall 77*a* is 39.0 mm and the inner diameter of outer ring 74 is 39.1 mm. Additionally or alternatively, airfoil fabric 56 is adhesively connected to outer ring 74 to ensure reliable operation of valve 73 without detachment.

The axial length of valve 73 from the outer surface of motor 71 to the inner surface of a seated valve element 79 may be as short as approximately 3 cm to ensure storability of the airfoil within the cartridge when folded.

Figure 18:
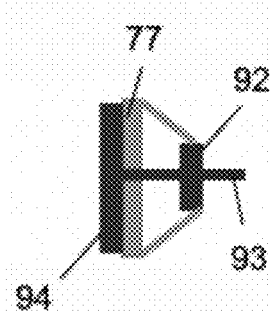
FIG. 18 is a schematic side view of a compressor used for inflating an airfoil that is in sealed engagement with the valve seat of FIG. 12.
Figure 19:
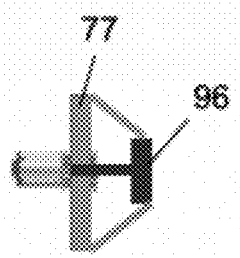
FIG. 19 is a schematic side view of a set of fan blades used for inflating an airfoil that is in sealed engagement with the valve seat of FIG. 12.

In other embodiments operating in conjunction with valve seat 77, the airfoil may be inflated by means of a compressor 92 shown in FIG. 18 that draws and compresses a compressible fluid such as CO2 stored in a canister 94 using a nozzle and a conventional valve 93 or by means of a set of motor-driven axial-flow fan blades 96 shown in FIG. 19 that draw and compress ambient air, while being introduced into the airfoil interior.

The motor driving the valve element, compressor or fan blades may be powered by the main battery of the drone through flexible wires, and connected to the processing unit by a wired electrical connection. Alternatively, each motor may be powered by a battery and wirelessly connected to the processing unit. Each motor may also be connected by a wired connection to the main drone battery and wirelessly connected to the processing unit.

It will be appreciated that airfoil 59A and 59B, as well as any of the inflating means described herein, are suitable for use with respect to deceleration system 20 of FIG. 6.

Figure 21:
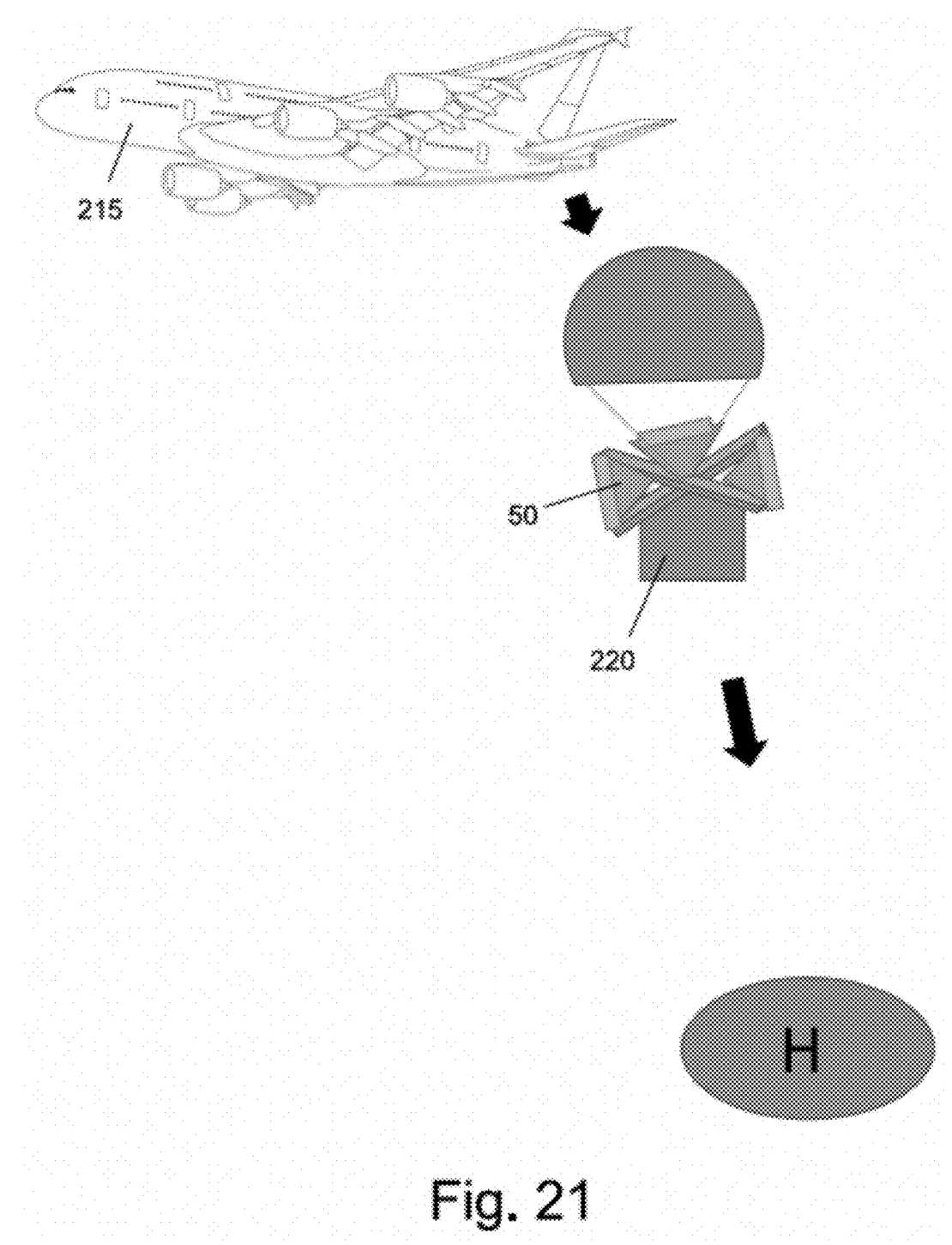
FIG. 21 schematically illustrates another embodiment of a redirectable airborne platform.

FIG. 21 illustrates platform 220 functioning as an aerial delivery parachute on which is loaded a passive payload such as a package. Platform 220 is discharged from a fixed-wing aircraft 215, and the payload is intended to be parachuted accurately to specific location H. When platform 220 comprises for example deceleration system 50 of FIG. 7, airfoil 59B of FIG. 15 and processing unit 110 of FIG. 5E, the payload may be parachuted directly to location H even though the platform is advantageously unpropelled. It will be appreciated that platform 220 may comprise any other combination of components described herein.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for decelerating and redirecting an airborne platform, comprising the steps of:
   a) retaining a flexible airfoil in non-deployed form in controllably releasable secured relation with each corresponding arm of a circular platform; and
   b) upon detecting sensory data that is indicative of uncontrollable flight conditions, triggering release of one or more of said retained airfoils from said corresponding arm and causing each of said released airfoils to be circumferentially displaced from a first arm to a second arm of said platform to occlude an adjacent inter-arm region,
   wherein each of said circumferentially displaced airfoils generates a sufficient value of localized lift that causes said platform which is descending to change its direction of descent from a first direction to a second direction.

2. The method according to claim 1, wherein release of the one or more retained airfoils from the corresponding rotor arm is triggered in response to detection of an underlying obstacle.

3. The method according to claim 1, wherein all of the one or more retained airfoils are released from the corresponding rotor arm to ensure continued descent in the first direction if an obstacle is not found within a predetermined distance of a present location of the drone.

4. The method according to claim 1, further comprising the step of adjusting a planform of one or more airfoils that has occluded an adjacent inter-arm region.

5. A decelerating system for use in conjunction with an airborne platform, comprising:
   a) a plurality of airfoils;
   b) an airfoil retainer for maintaining each of said airfoils in non-deployed form with respect to a corresponding radially extending arm of said platform;
   c) a securing element for controllably and releasably securing said airfoil to a corresponding platform arm;
   d) a displacement initiator for circumferentially displacing one or more of said airfoils, after being released from said retainer, from a first platform arm to a second platform arm to occlude an adjacent inter-arm region; and e) a motor for driving said displacement initiator.

6. The decelerating system according to claim 5, further comprising one or more sensors for detecting predetermined rapid descent of the platform and a safety-ensuring processing unit in data communication with said one or more sensors and with each of the displacement initiator motors, wherein a triggering signal to cause circumferential displacement of the one or more of the airfoils is transmitted from said safety-ensuring processing unit to each of the displacement initiator motors in response to detection of said predetermined rapid descent.

7. The decelerating system according to claim 6, further comprising a rotary ejector for rotating about a longitudinal axis of the platform to cause circumferential displacement of the one or more airfoils and a corresponding interface element which are in data communication with the safety-ensuring processing unit, wherein the interface element is controllably extendible from the ejector to each of the airfoils, wherein engagement of an extended interface element with an airfoil portion causes the corresponding airfoil to be circumferentially displaced to occlude the adjacent inter-arm region during rotation of the ejector.

8. The decelerating system according to claim 7, further comprising a collision avoidance system in data communication with the safety-ensuring processing unit for transmitting a detection signal to the safety-ensuring processing unit upon detecting an obstacle along an uncorrected descent path in a first direction of the drone, wherein the safety-ensuring processing unit is operable to calculate a required direction of descent in order to avoid said obstacle and to cause a sufficient number of the airfoils, following transmission of the triggering signals, to become circumferentially displaced, each of said circumferentially displaced airfoils generates a sufficient value of localized lift that causes said descending drone to change its direction of descent from said first direction to a second direction which is suitable to avoid said obstacle.

9. The system according to claim 8, wherein the safety-ensuring processing unit is configured to direct the platform to a specific landing area.

10. The decelerating system according to claim 6, wherein the safety-ensuring processing unit is an onboard computer.

11. The decelerating system according to claim 6, further comprising planform adjusting means for each airfoil that is responsive to the transmission of the triggering signal and to the circumferential displacement of the one or more airfoils.

12. The decelerating system according to claim 11, wherein the planform adjusting means is configured to inflate or deflate at least one of the one or more airfoils that has occluded an adjacent inter-arm region.

13. The decelerating system according to claim 11, wherein the planform adjusting means is configured to reposition a portion of at least one of the airfoils that has occluded an adjacent inter-arm region.

14. The decelerating system according to claim 13, wherein the planform adjusting means is configured to reposition a portion of at least one of the airfoils that has occluded an adjacent inter-arm region by repositioning an angle of a radially inward tip of the at least one airfoils with respect to a horizontal plane.

15. The system according to claim 11, wherein the safety-ensuring processing unit is additionally operable to cause at least one additional airfoil of the plurality of airfoils to become circumferentially displaced, to occlude an adjacent inter-arm region during descent of the drone, and, if needed, to selectively activate the planform adjusting means of said at least one additional airfoil.

16. The decelerating system according to claim 6, wherein the safety-ensuring processing unit is operable to cause deactivation of a rotor-based propulsion system associated with the drone.

17. A selectively inflatable and circumferentially displaceable airfoil capable of occluding a corresponding inter-arm region of a circular platform comprising a plurality of radially extending arms and directing said circular platform when unpropelled to a specific landing area, said airfoil comprising a two-layered fabric defining an interior therebetween and formed with one or more openings; a valve seat irremovably secured to said fabric at each of said openings; and an inflating unit sealingly engageable with a corresponding valve seat which, when actuated, is configured to inject a suitable amount of a pressurized gas into said airfoil interior to a pressure that prevents airfoil wobbling when said platform is being directed to said specific landing area.

* * * * *